Jan. 11, 1949.  H. E. GOETZ  2,458,508
SAMPLING DEVICE
Filed Oct. 8, 1946
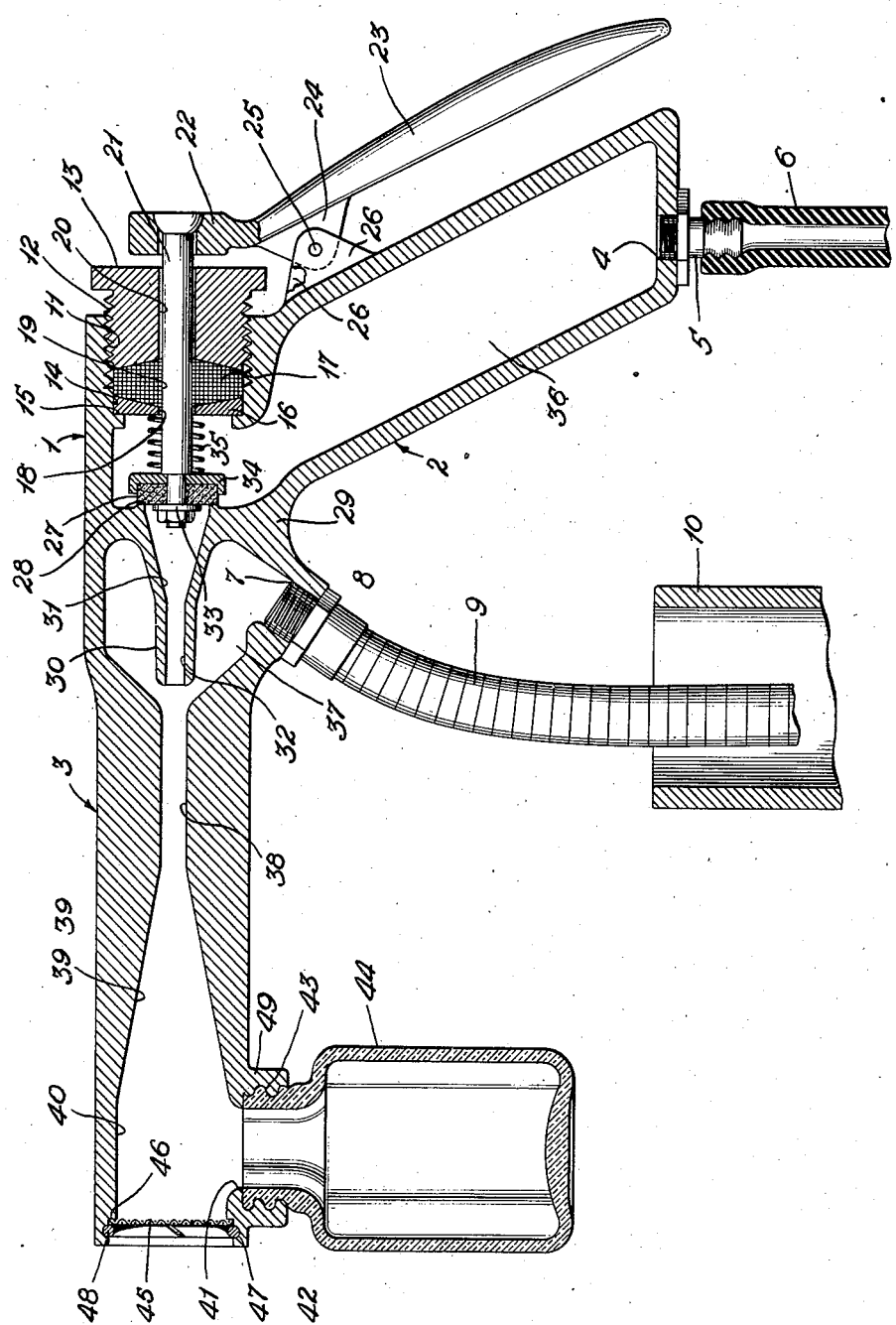
INVENTOR
HENRY E. GOETZ
BY
ATTORNEY Patented Jan. 11, 1949

2,458,508

UNITED STATES PATENT OFFICE 2,458,508

SAMPLING DEVICE

Henry E. Goetz, Brooklyn, N. Y.

Application October 8, 1946, Serial No. 701,972

4 Claims. (Cl. 73—421)

This invention relates to sampling devices in general and more especially for devices for withdrawing for testing purposes and the like a predetermined quantity of oil from the crankcase of an automotive engine or the like.

Among the objects of the present invention it is aimed to provide an improved portable sampling device which may with a minimum of effort be connected to an air pressure line and to an oil reservoir such as the crankcase of an automotive engine for withdrawing and collecting a predetermined quantity of oil to test the same or the like.

These and other features, capabilities and advantages of the present invention will appear from the subjoined detail description of one specific embodiment thereof illustrated in cross section in the accompanying drawings.

In the drawings there is shown a main body 1, in the present instance formed of one piece and preferably composed of a casting having a chambered handle 2, at an angle to the barrel 3. The lower end of the handle 2 has an internally threaded opening 4 therein to receive the nipple 5 of the conduit 6, in the present instance shown as the flexible rubber hose of a source of air pressure, pump, or the like. At the conjunction of the handle 2 and barrel 3, in the present instance, there is formed a second internally screw threaded opening 7 to receive the nipple 8 of the conduit 9, in the present instance shown as a flexible metal hose, the free end of which is inserted into the inlet of an oil reservoir such as the breather pipe 10 shown, illustrative of the breather pipe of an automobile engine.

At the rear end of the barrel 3 there is formed an internally screw threaded opening 11 to receive the threads 12 of the centrally chambered closure member 13. At the inner end of the opening 11 there is formed a recess 14 adjacent an annular shoulder 15. The shoulder 15 is adapted to receive the washer 16 with the packing 17 disposed between the washer 16 and the closure member 13. The washer 16, packing 17, and closure member 13 are provided with alined central openings 18, 19 and 20 to receive the stem 21, connected at one end to the head 22 of the lever 23 provided with a projection 24 pivotally connected by the pin 25 to the parallel lips 26 extending from the rear end of the handle 2. The inner end of the stem 21 is provided with a yieldable disk 27 constituting a valve for engaging the annular edge 28 of the wall 29 having a chambered extension 30, the extension 30 having a converging opening 31 terminating in its front end in the narrow opening 32. The valve disk 27 is secured to the front end of the stem 21 between the metal washer 33 and the cup 34 with the spring 35 disposed around the stem 21 between the cup 34 and the washer 16 normally and yieldably to maintain the valve 27 in engagement with the annular seat 28, and thereby to shut off communication from the chamber 36 to the opening 31.

Preferably as shown, there is formed an annular chamber 37 around the extension 30 which is in communication with the diminished opening 38, which in turn is in communication with the diverging opening 39 in communication with the enlarged opening 40. Preferably at the lower end of the enlarged opening 40 there is provided a second opening 41 having an internally screw thread 42 to receive the external screw thread 43 of the container 44. The container 44 preferably is composed of glass so that the contents can be optically inspected. The front end of the opening 40 in turn is open but free passage of oil therethrough restricted by the screen 45 composed, as an instance of brass, copper, steel or the like foraminous material in which the openings correspond to a sixty mesh screen. This screen is in disk form so that its annular edge rests in the shoulder 46 adjacent to which there is formed an annular recess 47 to receive the snap ring 48.

When it is desirous with this pump to withdraw a small quantity of oil from the power oil chamber, such as the crankcase of an automobile engine, it is only necessary to connect the conduit 6 of an air pressure line to the nipple 5 to attach the container 44 to the annulus or neck 49, to insert the free end of the conduit 9 through the breather pipe 10 into the oil in the crankcase, and then after turning on the air pressure deflecting the handle 23 so that the valve 27 is withdrawn from the seat 28 to enable the air under pressure to pass from the conduit through the chamber 36 into the extension 30, and from it out past the screen 45. In this way a vacuum will be created in the usual way to suck in oil by means of the conduit 9 and direct it into the chamber 40. The mesh of the screen 45 is such that only the air may pass through the same and the oil will be restricted and deflected to flow down into the container 44. While it is conceivable that some infinitesimal particles may pass through the screen 45 with the air, practice has shown that this amount is so small as to be negligible.

After a sufficient amount of oil has been so withdrawn from the crankcase, then either by optical inspection it can be determined whether the oil is still satisfactory or the contents subjected to other tests, such as viscosity, weight, or the like.

The enlarged chamber 40 cooperates with the diminished chamber 38 so to reduce the speed of flow of the stream of oil charged air that the screen 45 will function to separate the oil particles from the air stream. In other words, the screen will allow the air to pass therethrough to obstruct the major portion of the oil and cause it to flow down into the container 44.

It is obvious that various changes and modifications may be made to the details of construction without departing from the general spirit of the invention as set forth in the appended claims.

I claim:

1. The combination of a barrel and a chambered handle, a spring pressed valve for interrupting communication from said handle to said barrel, a manually operated lever operatively connected to said valve to open the same and establish communication between said chambered handle and said barrel, said chambered handle having an inlet, a conduit for connecting said barrel to a power oil reservoir, said barrel having two outlets, a container connected to one of said outlets to receive oil drawn into said barrel by suction when said valve is opened, and a screen for said other outlet to filter the oil from the air stream passing therethrough.

2. The combination of a barrel having a restricted passage, an enlarged passage, and an outwardly flaring passage connecting said restricted passage to said enlarged passage, a handle having a chamber formed to communicate with the restricted passage of said barrel, a normally closed valve for interrupting communication from the chamber in said handle to the restricted passage in said barrel, means for actuating said valve to establish communication between the chamber in said handle to the restricted passage in said barrel, the chamber in said handle having an inlet, an air pressure supply line connected to said inlet, the enlarged passage in said barrel having an inlet, a conduit for connecting said barrel inlet to the crankcase of an automobile engine, said barrel having two outlets, a container connected to one of said outlets to receive oil drawn into said barrel by the suction created when said valve is opened, and a screen for said other outlet to filter the oil from the air stream passing therethrough and thus enable it to flow into said container.

3. The combination of a barrel having a restricted passage, an enlarged passage, and an outwardly flaring passage connecting said restricted passage to said enlarged passage, a handle having a chamber formed to communicate with the restricted passage of said barrel, a normally closed valve for interrupting communication from the chamber in said handle to the restricted passage in said barrel, means for actuating said valve to establish communication between the chamber in said handle to the restricted passage in said barrel, the chamber in said handle having an inlet, an air pressure supply line connected to said inlet, the enlarged passage in said barrel having an inlet, a conduit for connecting said barrel inlet to the crankcase of an automobile engine, said barrel having two outlets, one of said outlets being formed at the lower end of the discharge end of the enlarged passage in said barrel, the other outlet being formed beyond said first named outlet, a container connected to said first named outlet to receive the oil drawn into said barrel by the suction created when said barrel is opened, and a screen for said other outlet to filter the oil from the air stream passing therethrough and thus enable it to flow into said container.

4. The combination of a barrel having an enlarged chamber, a restricted passage in communication with said enlarged chamber, an outwardly flaring passage in communication with said restricted passage, an enlarged passage in communication with said flaring passage, a handle having a chamber, a chambered projection extending from said handle into the enlarged chamber in said barrel and formed to establish a communication between the chamber in said handle and the enlarged chamber in said barrel, a normally closed valve for interrupting communication from the chamber in said handle to the chambered projection, means for actuating said valve to establish communication between the chamber in said handle to the chambered projection, said handle having an inlet, an air pressure supply line connected to said inlet, the enlarged chamber in said barrel having an inlet, a conduit for connecting the inlet in said enlarged chamber to the crankcase of an automobile engine, said barrel having two outlets, one of said outlets being formed at the lower end of the discharge end of the enlarged passage in said barrel, the other outlet being formed beyond said first named outlet, a container connected to said first named outlet to receive the oil drawn into said barrel by the suction created when said barrel is opened, and a screen for said other outlet to filter the oil from the air stream passing therethrough and thus enable it to flow into said container.

HENRY E. GOETZ.

REFERENCES CITED

The following references are of record in the file of this patent:

UNITED STATES PATENTS

| Number | Name | Date |
| --- | --- | --- |
| 1,054,579 | Mahon | Feb. 25, 1913 |
| 1,751,719 | Uhri, Jr. | Mar. 25, 1930 |
| 2,091,810 | Ferraez, Jr. | Aug. 31, 1937 |
| 2,177,060 | Drew | Oct. 24, 1939 |
| 2,240,888 | Hageline | May 6, 1941 |